United States Patent Office 3,529,067
Patented Sept. 15, 1970

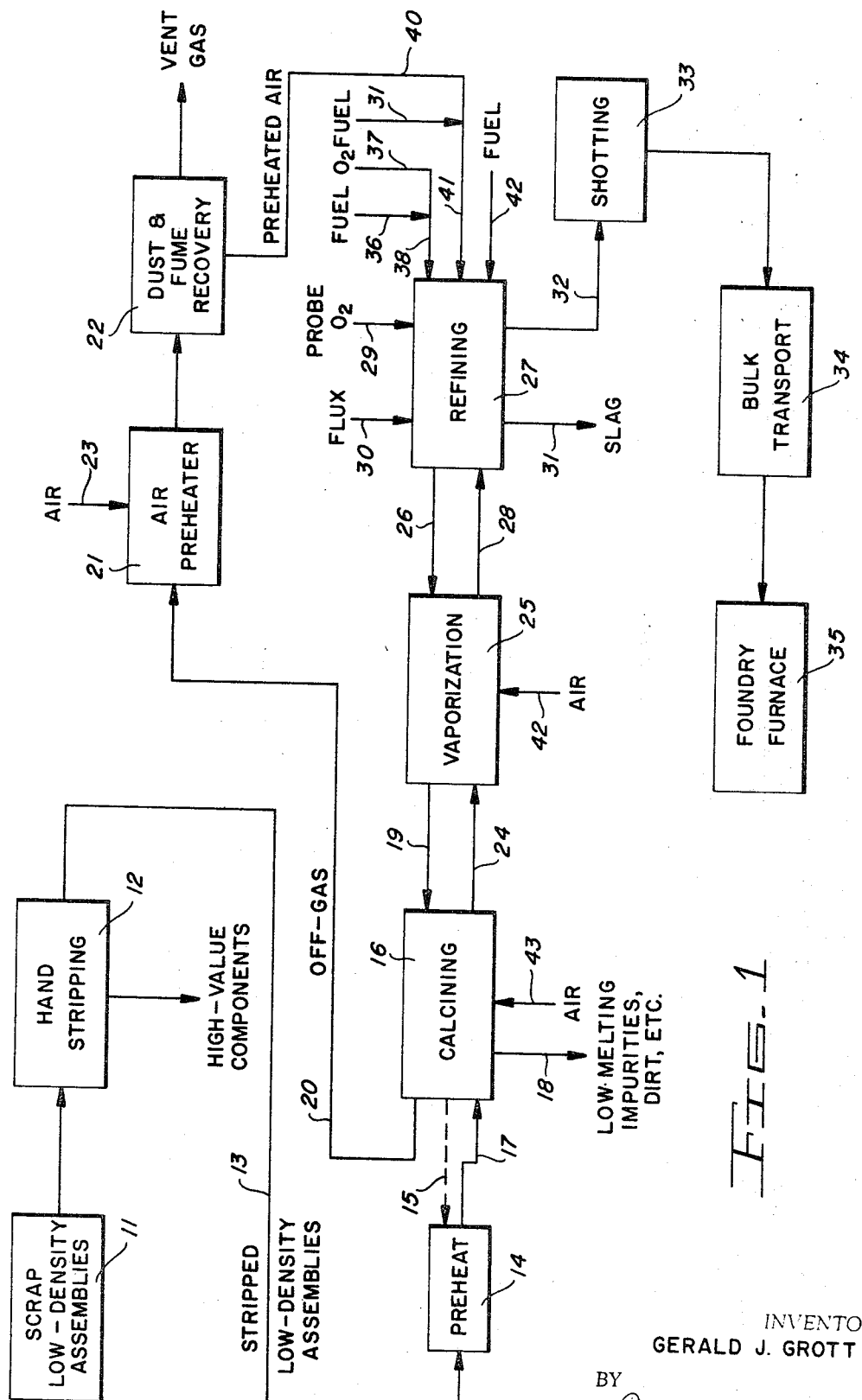

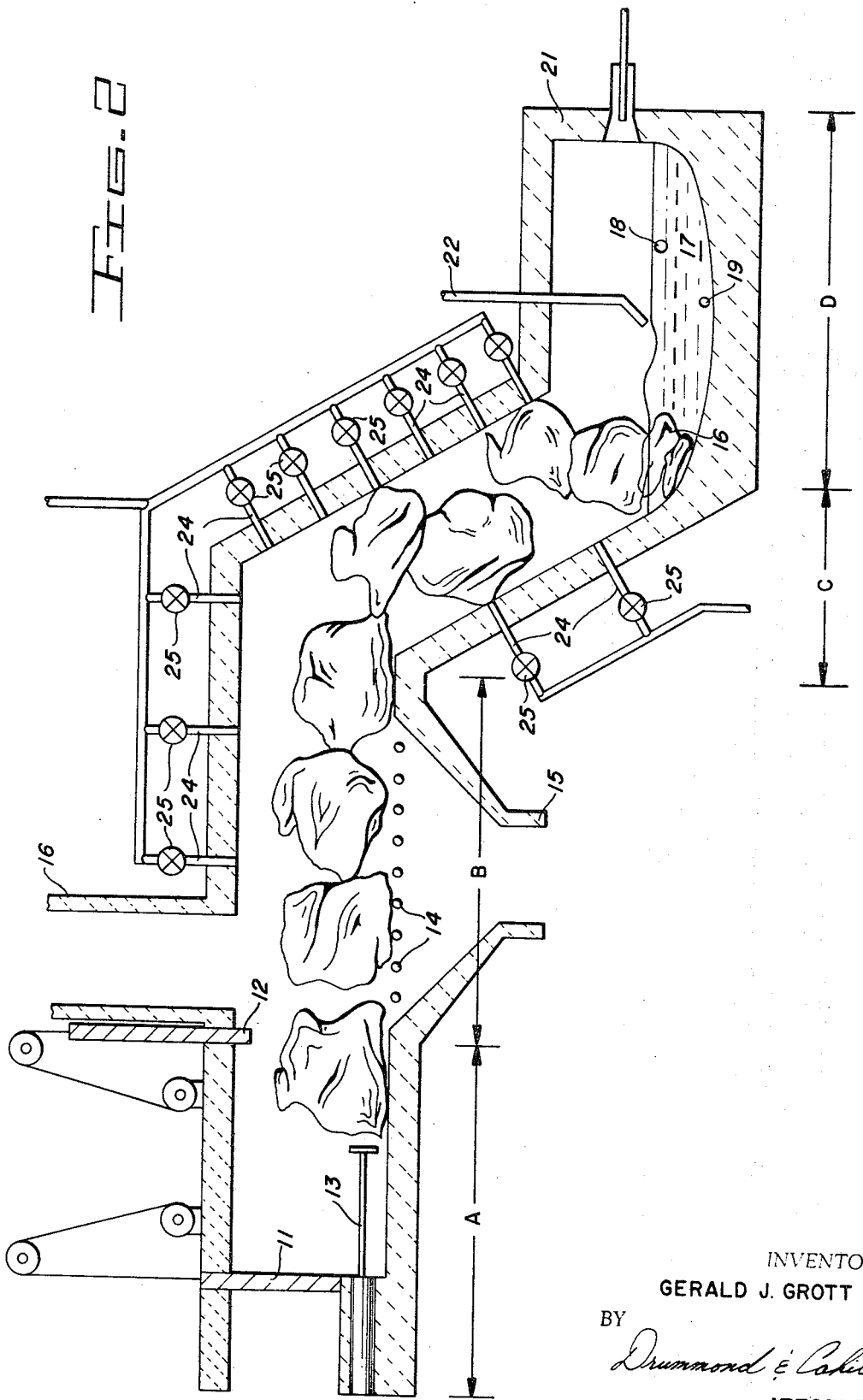

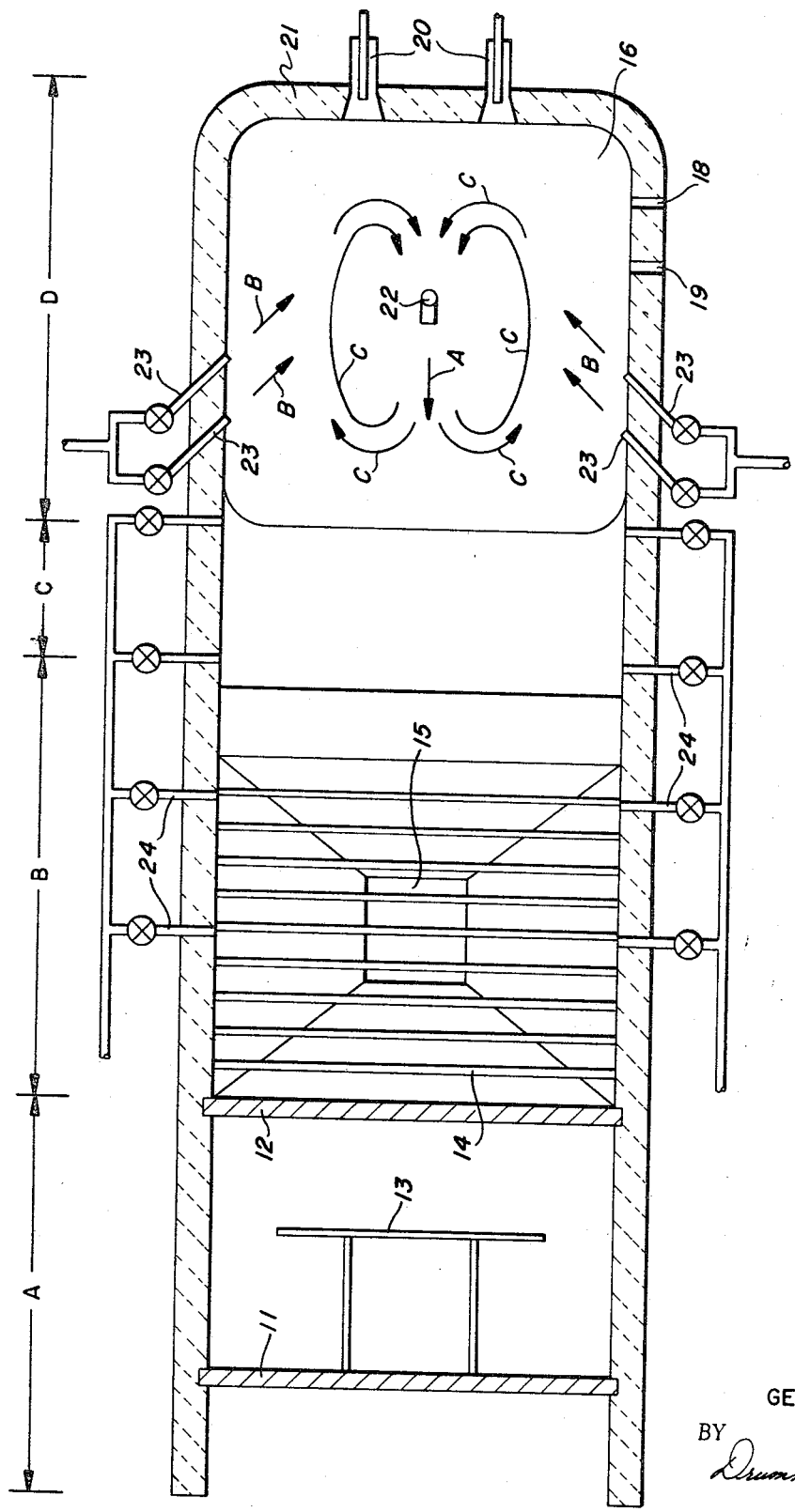

3,529,067
METHOD AND APPARATUS FOR RECLAIMING LOW-DENSITY CONTAMINATED SCRAP STEEL
Gerald J. Grott, 1205 Orlando Drive, Coolidge, Ariz. 85228
Filed Aug. 21, 1968, Ser. No. 754,413
Int. Cl. H05b 7/18
U.S. Cl. 13—1      7 Claims

ABSTRACT OF THE DISCLOSURE

Steel is reclaimed from low-density scrap assemblies by subjecting the scrap to a calcining step in which organic impurities are gasified, a vaporization step in which certain metallic impurities are fumed off of the scrap, and a refining step in which the scrap is melted and, preferably, oxidized in the presence of a flux to separate slag-forming metallic impurities. The heat requirements for these steps are supplied by introducing a partially combustible fuel-oxygen mixture into the refining zone and passing the resultant partial combustion products countercurrently through the vaporization and calcining zones. Additional air is injected at spaced points along the vaporization and calcining zones to progressively increase the degree of combustion of the countercurrent gas stream, liberating the additional heat required for these steps.

---

This invention relates to methods and apparatus useful in reclaiming scrap steel.

More particularly, the invention concerns methods and apparatus especially adapted to reclaim low-density contaminated steel scrap.

In another aspect, the invention concerns a novel furnace for reclaiming low-density contaminated scrap steel in which the bulk of the impurities is removed by vaporization and, where necessary, by slagging.

In still another aspect, the invention relates to novel furnaces for oxidizing contaminated iron melts to slag off or vaporize the impurities but in which the iron oxide concomitantly produced is prevented from contacting the refractory furnace lining, thereby reducing the rate of corrosion of the lining.

In the past, it has been common practice in steel-making processes to add significant quantities of scrap steel materials to the foundry furnace. In these older steel-making processes, the melter exercised his personal judgment in deciding on the quantity and types of scrap material to add in order to compensate for variables in the purity of the scrap.

However, in modern steel-making operations, automatic process control apparatus is extensively employed and the success of the operation depends on the use of high-speed, high-volume, accurately controlled materials-handling devices in order to achieve low material-handling costs as well as to achieve proper control of the process variables. Much of the steel scrap prepared for use according to prior art methods is unsuitable for use in automatically controlled steel-making processes as its composition varies significantly and the physical shape of such scrap makes it difficult to handle in automatic feeding equipment.

One of the most important sources of scrap steel is the relatively low-density, highly contaminated scrap obtained from old automobiles, refrigerators, and other appliances. In the prior art, particularly in the reclamation of scrapped automobiles, it has been customary and usual practice to rather thoroughly strip the scrap of various relatively valuable components such as tires, radiators, electrical systems and the heavy cast and machined parts such as the engine block, transmission, etc. Thereafter, the stripped scrap was handled according to a number of techniques. In one system, the stripped automobile body was merely compressed in a giant baling machine to increase the bulk density of the scrap, thereby reducing transportation costs. In another technique, the stripped automobile body was shredded and the shredded scrap was then subjected to a magnetic separation step to separate the ferrous and non-ferrous metals. The shredded, magnetically separated ferrous scrap was then subjected to a low-temperature burning operation to remove combustible impurities and thereafter shipped to the foundry. Finally, in another technique, the shredded scrap was subjected to hand-sorting followed by melting to produce 40–60 pound pigs for shipment to the foundry.

Such conventional methods for preparing such low-density contaminated scrap for use in steel-making processes are rapidly becoming unacceptable because the preparation methods do not ordinarily attempt to remove undesirable materials such as metallic or ceramic coatings, platings, paint, oil, grease, undercoating, etc. Furthermore, the processed scrap is handled on a decidedly macro-scale and cannot be reliably sampled to determine its composition prior to introduction into a foundry furnace. Finally, the standard equipment in the steel-making industry for handling iron ore cannot handle scrap according to prior art preparation methods, even where the scrap is "shredded."

Thus, it would be highly advantageous to provide methods and apparatus for converting low-density contaminated scrap steel to a size and shape which can be handled by presently existing raw-materials handling facilities in steel mills and foundries. Furthermore, it would be highly advantageous to provide such methods and apparatus which would remove oxidizable and vaporizable impurities from the scrap steel and which would produce a scrap product in a form which can be accurately sampled and analyzed by means of techniques and equipment which are already standard in the steel-making industry.

Accordingly, it is a principal object of the present invention to provide methods and apparatus for reclaiming low-density contaminated scrap steel materials.

Another principal object of the invention is the provision of such methods and apparatus which are especially adapted to provide products which can be handled, sampled and analyzed by methods and apparatus currently available in the steel-making industry.

Still another object of the invention is the provision of methods and apparatus for reclaiming low-density contaminated scrap steel which produces a product which can be conveniently and practically charged to foundry furnaces which are operated on automatic process control.

Yet another object of the invention is the provision of a novel furnace for oxidizing melts of scrap steel in which iron oxide, concomitantly produced in the oxidizing operation, is maintained out of contact with the refractory lining of the furnace to improve the life of the furnace lining.

These and other, further and more specific objects and advantages of the invention will become apparent to those skilled in the art from the following detailed description, taken in conjunction with the drawings, in which:

FIG. 1 is a schematic flow sheet depicting the presently preferred embodiment of the invention chosen for purposes of illustration;

FIG. 2 is a cross-sectional view of a melting-oxidizing-vaporizing furnace embodying features of the invention and which is useful in the process illustrated in FIG. 1; and FIG. 3 is a cross-sectional view of the furnace of FIG. 2 taken along section line 3—3 thereof.

As used herein, the term "low-density contaminated scrap steel" is intended to include a wide variety of manufactured items such as washing machines, water heaters, refrigerators, automobiles and any similar assemblies or articles of manufacture which are predominantly fabricated from steel into shapes and assemblies which may include large void spaces and which ordinarily includes a variety of other impurities such as enamel, porcelain, phosphates, chromates, zinc coatings, chrome platings, undercoatings, plastics and the like. It is to such types of scrap that the methods and apparatus of the present invention are most advantageously employed.

According to my invention I provide a method for reclaiming steel from low-density scrap assemblies which ordinarily contain ferrous metals such as various grades of steel, cast iron and the like; organic impurities such as paints, insulation materials, automobile undercoatings, electrical insulation materials, rubber and plastic moldings, etc.; vaporizable metallic impurities such as cadmium, zinc, tin, lead and antimony and compounds thereof; and slag-forming metallic impurities such as silicon, manganese, chromium and phosphorous, and compounds thereof.

The low-density scrap assemblies are typically pre-stripped of valuable components such as engines, transmissions, some of the electrical wiring, radiators, tires, etc., and then introduced successively into a calcining zone, a vaporization zone and a refining zone, which zones are typically and preferably contained within an integral furnace of novel design described below. A partially combustible fuel-oxygen mixture is burned in the refining zone and the partial combustion products are then passed countercurrently through the vaporization and calcining zones. Additional oxygen is injected into the vaporization zone and into the calcining zone to successively advance the degree of oxidation of the partial combustion products passing countercurrently therethrough, liberating the additional heat required for performing the vaporization and calcining steps.

By controlling the temperature and oxygen concentration in the calcining zone, the bulk of the organic impurities is gasified, i.e., vaporized or chemically converted to gaseous components such as carbon dioxide, carbon monoxide, etc., at temperatures and residence times sufficiently low to avoid any substantial oxidation of the ferrous metals. Similarly, control of temperature and oxygen concentration in the vaporization zone causes vaporization ("fuming") of metallic impurities having an effective partial pressure sufficiently high to be vaporized prior to any substantial melting or oxidation of the ferrous metal components of the scrap. After gasification of the organic materials and fuming of the vaporizable metallic impurities, the scrap assemblies are then melted in the refining zone and the resulting melt is oxidized in the presence of a flux to form a fluent slag on the surface of the melt, the slag containing the remaining slag-forming impurities still associated with the ferrous materials. In a preferred embodiment, the carbon content of the melt is adjusted in the refining zone to provide an overall composition corresponding generally the plain carbon steel.

As will be apparent to those skilled in the art, the oxidation and slagging step may optionally be omitted in those instances where the impurities thereby removed are not objectionable according to the end use of the product. Thus, where the product is to be used in the production of grey iron, the oxidation-slagging step can be omitted since the amounts of phosphorous and sulfur impurities ordinarily found in such scrap are not objectionable in this material.

After completion of the melting and/or refining steps, the molten ferrous metal is then removed from the refining zone and may be cast into pigs, shotted or otherwise prepared for bulk transport to the foundry furnace. In a preferred embodiment, the product is shotted to facilitate handling with bulk-material-handling equipment and to facilitate its use in foundry furnaces which are operated by automatic process control instruments.

In the novel furnace which is advantageously employed in the practice of the method described above, the calcining, vaporization and refining sections form a single elongate chamber. A vestibule section communicates with the calcining section to facilitate the preheating and introduction of scrap into the calcining section. The calcining section is elevated above the refining section, and the vaporization section is an inclined portion of the furnace joining the calcining and refining sections. The entire furnace is formed of refractory materials according to art-recognized expedients.

The vestibule section is provided with an inner door communicating with the calcining section and an outer door which may be opened to introduce additional scrap into the vestibule. The doors are operated on the familiar "air-lock" principle such that only one is open at a time, thereby reducing heat losses from the furnace. Except when charging new scrap into the vestibule, the inner door remains open, allowing the scrap within the vestibule to be preheated by radiation from the calcining section.

A grate is provided in the floor of the calcining section which permits the withdrawal of low-melting impurities and char separated from the assemblies during the calcining step and means are provided for withdrawing the off-gases from the furnace and conducting them to an air preheater and a dust and fume recovery plant.

The vaporization section is inclined at an angle slightly greater than the angle of repose of a plurality of the scrap assemblies. Assemblies received from the calcining section move downwardly along the inclined floor of the vaporization section and are ejected therefrom into the refining section as preceding assemblies are melted.

The floor of the refining section is a refractory hearth adapted to retain molten metals resulting from the melting of the scrap assembly received from the vaporization section. In a preferred embodiment, oxidation of the melt is carried out by directing an oxygen jet against the surface of the melt, providing a localized high-temperature oxidation zone in the hearth, and jets of a reducing hydrocarbon gas are introduced along the side walls of the hearth to prevent portions of the melt containing high proportions of iron oxide from contacting the refractory walls, thereby improving the life of the refractory. The jets are positioned to provide a swirling action in the melt which directs the iron oxides produced in the localized oxidation zone away from the refractory walls. Tap holes are provided for withdrawing slag and the product ferrous metals. A series of burners above the surface of the melt is provided for the purpose of introducing and burning the partially combustible fuel-oxygen mixture above the melt. The partial combustion products are then directed upwardly through the vaporization zone, into the calcining zone and withdrawn from the furnace at the far end of the calcining zone. Additional oxygen, preferably in the form of air, is injected at spaced points along the vaporization and calcining zones, causing further completion of the combustion of the fuel injected into the refining zone and liberating the additional heat necessary for the vaporization and calcining steps.

The overall method of treatment of the low-density scrap assemblies and the operation of the furnace is further illustrated in FIG. 1 which is a schematic flow sheet depicting the presently preferred embodiment of the invention chosen for purposes of illustration.

The low-density scrap assemblies 11 are ordinarily subjected to hand-stripping 12 to remove high-value components. In the case of scrap automobiles, these high-value components usually include the engine, transmission, wheels, radiator, generator, battery and cables, starter, heater motor and core, etc. By experience, it is known that such scrap automobiles are usually minus approximately one-half of the original glass, zinc and aluminum which an automobile normally contains. The stripped low-density assemblies 13 are introduced into a preheating zone 14 and may, for example, be heated by radiation 15 from the calcining zone 16 or by any other suitable means. The preheated scrap 17 is then introduced into the calcining zone 16 in which organic impurities are burned or otherwise gasified and low-melting impurities 18 are melted and separated from the scrap steel assemblies. The gasified and burned organic materials mix with the partial combustion products and fume 19 entering the calcining zone to form the off-gas which may be conducted through an air preheater 21 for the purpose of preheating incoming air 23 which is used at another stage of the process. The off-gas may be thereafter treated 22 to recover dust and fume. The calcined scrap 24 is introduced into a vaporization zone 25 where, through contact with partial combustion products 26 received from the refining zone 27, the calcined scrap is further purified by the vaporization of volatile impurities which mix with the partial combustion products 26 and form the gaseous feed 19 to the calcining step 16.

After the scrap has been subjected to the vaporization step, it is introduced 28 into the refining zone 27. Here, depending upon the desired characteristics of the final product, the scrap may be either merely melted, thereby facilitating its conversion into a more convenient form for handling or, in a preferred embodiment, the molten scrap is subjected to an oxidation-slagging operation for the removal of oxidizable slag-forming impurities. In this embodiment, oxygen 29 is supplied to a probe which directs a jet of oxygen against the surface of the melt, forming a hot spot in which the bulk of the oxidation is accomplished. A suitable flux 30 such as lime is introduced into the refining zone and forms a fluent slag with the oxidized slag-forming impurities. The slag 31 is periodically tapped from the refining zone and the molten steel product 32 is withdrawn and transferred to a shotting plant 33 or, alternatively, may be cast into pigs or other suitable shapes for handling by means of bulk transport to transfer it to a foundry furnace 35. As will be apparent to those skilled in the art, if the steel reclaiming operations are conducted in close proximity to the foundry furnace, the product may be merely transferred in its molten form 32 to the foundry furnace, omitting the shotting and bulk transport steps.

In operating the process described above, heat is furnished by injecting a partially combustible mixture of fuel and oxygen into the refining zone 27 where it is ignited and burned, forming partial combustion products 26 which are passed countercurrently to the scrap through the vaporization zone 25 and the calcining zone 16 and ultimately to an air preheater 21 and through a dust and fume recovery plant 22. In a preferred embodiment, the fuel is mixed in two separate streams; a first stream of fuel such as methane 36 mixed with substantially pure commercial oxygen 37, forming a partially combustible fuel-oxygen mixture 38. Additional fuel 39 is mixed with preheated air 40, forming a partially combustible fuel-oxygen mixture 41. Additional fuel 42 may optionally be injected directly onto the iron melt for the purpose of masking refractories in the refining zone and preventing contact between iron oxide formed at the hot spot and the refractories, thereby reducing the corrosion of the refractories by high concentrations of iron oxide. This technique will be explained later in connection with the description of FIGS. 2 and 3.

The amount of heat liberated from the partially combustible fuel-air mixtures introduced into the refining zone is controlled by injecting air streams 42 and 43 into the vaporization and the calcining zones, respectively. In this way, the point at which the additional heat is liberated and the amount of such additional heat liberated in each of the calcining and vaporization zones can be accurately controlled. In operation of my method, it is an important objective to maintain the oxygen concentration at a sufficiently low value which, according to the temperature and contact times encountered in the various steps of the process, will not result in the oxidation of a significant portion of the iron contained in the scrap assemblies. The effect of oxygen concentration, temperature and contact time upon the oxidation of iron in a gaseous atmosphere has been the subject of considerable study and suitable combinations of time, temperature and composition conditions which produce non-iron oxidizing conditions are disclosed in a number of technical articles. Thus, various conditions which will avoid the oxidation of the scrap steel can be selected by those skilled in the art having regard for the results of such studies and the disclosure herein.

For example, in a furnace such as that illustrated in FIGS. 2 and 3, sized for the production of ten tons/hour of reclaimed steel product, the residence temperature in each of the calcining and vaporization zones is approximately 20 minutes. Under these conditions, the gas temperature in the vaporization zone should be maintained in the range of about 2200–2500° F. and the partial pressure of oxygen in the vaporization zone gases should be maintained in the range of from about $10^{-10}$ to $10^{-5}$ atms. In the calcining zone, sufficient additional air is injected to just complete the combustion of the remaining unreacted fuel in the gas mixture plus the carbonaceous material volatilized from the scrap assemblies. The gas temperature should be maintained at not above approximately 2500° F.

As will be apparent to those skilled in the art, the temperatures in the various zones can be raised above those values specified above if the oxygen concentration or contact time is correspondingly reduced, and vice versa.

FIGS. 2 and 3 illustrate a furnace which is advantageously employed in the practice of the invention. The furnace is constructed of refractory materials according to art-recognized techniques and consists of a preheating vestibule section, generally indicated by reference character "A," a calcining section "B," a vaporization section "C" and a melting-oxidizing section "B." The vestibule section is provided with double doors 11 and 12 which are alternately opened, the outer door 11 being opened to admit scrap assemblies, the inner door 12 being closed during this time. After the scrap assemblies are admitted into the preheating zone, the outer door 11 is closed and the inner door 12 is opened such that the scrap is preheated by radiation from the calcining zone "B." At appropriate intervals, the preheated scrap is ejected from the calcining zone by any suitable means such as a hydraulic ram 13 into the calcining zone "B." Thereafter, the ram 13 is restricted, the inner door 12 is closed, the outer door 11 is opened and additional scrap assemblies may then be introduced into the preheating zone. The preheated scrap assemblies move across a grate 14 in the calcining zone "B" which permits trash, dirt and melted impurities to be separated from the scrap assemblies and withdrawn through the chute opening 15. Gasified organic impurities and the combustion products of the fuel-air mixture are withdrawn through the stack 16. The calcined assemblies then tumble into the inclined vaporization section "C" which communicates between the calcining section "B" and the melting-oxidizing section "D." The angle of inclination of the vaporization section "C" is slightly greater than the angle of repose of the assemblies, which permits the assemblies to move downwardly toward the melting zone "D" as the bottommost assemblies 16 are melted and become a part of the molten bath 17.

Slag tapping holes 18 and product tapping holes 19 are provided in the side wall of the furnace for removing the molten products after the completion of the melting and/or refining operations. A plurality of fuel burners 20 are provided in the end wall 21 of the melting-oxidizing zone. Only two of these burners are shown but, as will be appreciated by those skilled in the art, any suitable number of burners can be employed. In a preferred embodiment, the burners are provided with two different fuel-oxygen mixtures, a mixture of fuel with commercial oxygen and a mixture of fuel with preheated air. By appropriately balancing the quantities of fuel introduced with oxygen and with preheated air, maximum furnace efficiency can be attained. For example, in a preferred embodiment, approximately three-fourths of the fuel is introduced in the form of a fuel-oxygen mixture and approximately one-fourth of the fuel is introduced in a mixture with air preheated to about 1500–2000° F. When it is desired to oxidize the slag-forming impurities, an oxygen lance 22 is provided which directs a jet of oxygen against the surface of the bath, providing a localized high concentration of oxygen in contact with the molten materials to promote oxidation of the slag-forming impurities such as silicon, manganese, chromium and phosphorous and to adjust the carbon content of the molten charge to the desired level. In order to prevent molten oxides from contacting the refractory walls of the furnace, thus increasing the life of the furnace refractories, I provide a series of fuel-gas jets 23 which are located just above the surface of the molten charge and which direct the fuel gas in a direction to sweep the refractory walls, reducing iron oxide and preventing substantial contact between the refractory walls and portions of the molten charge having high oxide content. For example, in the embodiment illustrated in FIGS. 2 and 3 the oxygen jet is directed in the direction of the arrow A and the fuel jets are directed in the direction of the arrows B. This provides swirling currents, illustrated by arrows C, in the molten charge which carry portions of the charge having high oxygen concentration away from the side walls of the furnace. In a furnace sized to produce ten tons/hour of product, two gas jets on each side of the furnace are sufficient, each having a ⅛″ orifice, supplying 15 p.s.i.g. natural gas at a rate of 500 cubic feet/hour for each jet. A series of air inlets 24 are provided at spaced points along the length of the vaporization and calcining sections for the purpose of furnishing additional oxygen as the partial combustion products of the fuel-oxygen and fuel-air mixtures pass upwardly through the vaporization zone "C," through the calcining zone "B" and, finally, pass out of the furnace through the stack 16. As previously explained, the rate of introduction of air at the various spaced points is adjusted to liberate the heat requirements necessary to the performance of the vaporization and calcining steps of my method. This can be accomplished by providing each air inlet 24 with a suitable valve 25.

EXAMPLE

The following example is presented to illustrate the practice of the preferred embodiment of my method in the furnace illustrated at FIGS. 2 and 3. Unless otherwise indicated, all quantities are stated in terms of the amount per ton of iron and steel charged to the furnace.

Furnace design and heat loss

The furnace is sized for the production of ten tons/hour of product, the furnace having a cross-sectional area of approximately 100 square feet and each of the calcining, vaporization and melting-oxidizing sections being approximately 20 feet long. The furnace walls are 13.5 inches in thickness. At full production rate, the total heat loss from the furnace is approximately 10,420,000 B.t.u./hour for 1,042,000 B.t.u./ton of product.

Charge composition and characteristics

The charge consists of scrap automobile bodies with engine, transmission, wheels, radiator, generator, battery and cables, starter, heater core and motor removed. Approximately one-half of the glass, zinc and aluminum originally contained in each automobile body is missing. The iron and steel content of the scrap assemblies is:

TABLE A

| | Percent by wt. |
|---|---|
| Carbon | .40 |
| Silicon | .33 |
| Manganese | .60 |
| Copper | .10 |
| Nickel | .08 |
| Chrome | .18 |
| Phosphorous | .05 |
| Sulphur | .06 |
| Iron, elemental | 98.20 |
| Total iron and steel | 100.00 |

Each ton of iron and steel contained in the scrap assemblies has associated with it the following approximate weights of other impurities:

TABLE B

| | Pounds |
|---|---|
| Copper | 3 |
| Zinc alloy | .50 |
| Aluminum alloy | 45 |
| Miscellaneous, Pb, Sn, Sb | 7 |
| Total non-ferrous | 105 |
| Upholstery, mats, molding and other combustibles | 150 |
| Window glass | 45 |
| Dirt | 20 |
| Total | 320 |

Calcining

The object of the calcining step is to burn off the organic impurities and melt most of the non-ferrous scrap without oxidizing any of the other metallic components except the aluminum. Even the aluminum will not be totally oxidized so long as the organic impurities are burned or otherwise gasified without circulating excess air through the scrap.

Air is injected into the calcining zone only in amounts sufficient to gasify the organic impurities. These gases are then burned above the scrap when mixed with the air jetted through the side walls and roof of the calcining zone. Except during the charging of additional scrap, the inner door of the vestibule is open such that scrap assemblies within the vestibule are heated by radiation from the calcining zone. It is desired to completely gasify the organic impurities in the calcining zone as the presence of solid carbonaceous materials in the other sections of the furnace make it difficult to control the oxygen content in those sections, and complete gasification of the organic impurities prevents sulphur associated with the organic materials from contaminating the iron in the later steps. Gas temperature in the calcining zone is maintained at not above 2500° F. This prevents the metal temperature from exceeding 1800° F., which in turn prevents excessive oxidation of the iron in the scrap. Since the air is injected into the calcining zone above the scrap, a stoichiometric excess of air may be used because the burning occurs above the scrap and the scrap is heated primarily by radiation. The off-gas from the calcining zone contains enough heat to supply most or all of the requirements for preheating the air injected into the melting-oxidizing zone, as will be explained.

Vaporization

The function of the vaporization step is to vaporize various alloys and coatings from the scrap, primarily tin and zinc. These should be vaporized before they reach a temperature at which they will form alloys with the iron as dilution greatly reduces their vapor pressures. The oxygen content in the vaporization zone is maintained sufficiently high to vaporize the tin and it oxides but low enough to prevent excessive oxidation of the iron, preferably at about $10^{-9}$ atms.

Gases enter the vaporization zone at approximately 2600–2800° F. and leave the vaporization zone at approximately 2400–2500° F. Air is admitted to produce approximately 50–70%, preferably 67%, combustion of the fuel. Under these conditions, cadmium oxide, zinc oxide, tin oxide, lead oxide and antimony will exhibit effective total vapor pressures greater than 0.1 atm. which is sufficient to vaporize these impurities at an acceptable rate.

Melting-oxidizing

As previously explained, for certain markets the scrap received from the vaporization step may be merely melted and reduced to appropriate physical form such as shot, pigs, etc. However, in a preferred embodiment, I continue the processing to produce plain carbon steel by oxidizing and slagging off certain remaining impurities such as phosphorous, chromium, manganese and silicon and adjusting the carbon content of the melt prior to tapping the product from the furnace. Assuming the refining is to be continued in accordance with my preferred embodiment, oxygen is supplied to the lance at a rate of approximately 140 lbs./ton of product to oxidize 16 lbs. of non-ferrous impurities and approximately 85 lbs. of carbon. In this process, approximately 23 lbs. of iron is oxidized. Oxygen is supplied to the lance at a pressure of 50 p.s.i.g. and is injected through a ⅝-inch orifice against the surface of the bath to produce a "hot spot" temperature above 4000° F. Two jets of fuel gas on each side of the furnace, having ⅛-inch orifices, direct a stream of 15 p.s.i.g. methane at a rate of 500 cubic feet per hour per jet against the surface of the bath to keep the superheated, high-oxide-content slag away from the furnace refractories and to cool the slag and refractories along the furnace walls. The slag is maintained at a basicity ratio of 3:1 or greater with an iron oxide content of about 20% (15% FeO and 5% $Fe_2O_3$). These conditions assure effective removal of phosphorous. The carbon content of the melt is maintained in the range of 0.15–0.50%, preferably 0.30%, preventing substantial formation of red iron oxide fume.

The metal temperature in the bath is regulated to within the range 2800–2900 F. by adjusting the rate of introduction of methane fuel gas, preheated air and oxygen through the burners. 76% of the methane fuel gas is mixed with commercial oxygen and 24% is mixed with air preheated to 1800° F. Air and oxygen flows are regulated to provide 55–75% stoichiometric oxygen, preferably 57%. Under these conditions, the gas temperature above the melt will approximately be 3400° F.

The crucible is sized to provide a bath depth of about 15 inches of melted scrap or approximately 60 tons of ferrous metals together with 150 lbs. of slag/ton of ferrous metal. When the crucible contents reach 75 tons of ferrous metals, the slag is tapped, fresh lime flux is introduced, and the oxygen blow from the lance is continued until the maximum amount of phosphorous and sulphur is removed. The product is then tapped in an approximately 30 ton batch. If desired, the slag and metal can be continuously tapped, but in this practice, the phosphorous and sulphur are removed only in proportion to the amount of slag formed.

I claim:

1. A method for reclaiming steel from low-density scrap assemblies containing
    ferrous metals,
    organic impurities,
    vaporizable metallic impurities, and
    slag-forming metallic impurities,
to form a substantially homogenous ferrous product of improved purity, said method comprising the steps of:
   (a) introducing said assemblies successively into
       a calcining zone,
       a vaporization zone, and
       a refining zone;
   (b) burning a partially combustible fuel-oxygen mixture in said refining zone and passing the partial combustion products thereof countercurrently through said vaporization and calcining zones;
   (c) injecting additional oxygen into said vaporization and calcining zones to successively advance the degree of oxidation of said partial combustion products as said products pass therethrough;
   (d) controlling the temperature and oxygen concentration in said calcining zone by adjusting the rate of introduction of oxygen therein, to gasify said organic impurities from said assemblies introduced therewithin;
   (e) controlling the temperature and oxygen concentration in said vaporization zone by adjusting the rate of introduction of oxygen therein, to vaporize said vaporizable metallic impurities from said assemblies introduced therewithin;
   (f) controlling the temperature and oxygen concentration in said refining zone by adjusting the feed rate and stoichiometric proportions of said fuel-oxygen mixture burned therewithin, to form a melt of said assemblies introduced therewithin; and
   (g) withdrawing the refined melt as product from said refining zone.

2. Method of claim 1 in which the temperature and oxygen concentration in said calcining and vaporization zones are controlled to avoid substantial oxidation of ferrous metals in said assemblies.

3. Method of claim 1 which the partial pressure of oxygen in said vaporization zone is controlled to about $10^{-5}$ to $10^{-10}$ atmospheres.

4. A method for reclaiming steel from low-density scrap assemblies containing
    ferrous metals,
    organic impurities,
    vaporizable metallic impurities, and
    slag-forming metallic impurities,
to form a substantially homogenous ferrous product of improved purity, said method comprising the steps of:
   (a) introducing said assemblies successively into
       a calcining zone
       a vaporization zone, and
       a refining zone;
   (b) burning a partially combustible fuel-oxygen mixture in said refining zone and passing the partial combustion products thereof countercurrently through said vaporization and calcining zones;
   (c) injecting additional oxygen into said vaporization and calcining zones to successively advance the degree of oxidation of said partial combustion products as said products pass therethrough;
   (d) controlling the temperature and oxygen concentration in said calcining zone by adjusting the rate of introduction of oxygen therein, to gasify said organic impurities from said assemblies introduced therewithin;
   (e) controlling the temperature and oxygen concentration in said vaporization zone by adjusting the rate of introduction of oxygen therein, to vaporize said vaporizable metallic impurities from said assemblies introduced therewithin;
   (f) controlling the temperature and oxygen concentration in said refining zone by adjusting the feed rate and stoichiometric proportions of said fuel-oxygen mixture burned therewithin, to form a melt of said assemblies introduced therewithin;
   (g) oxidizing said slag-forming impurities in the presence of a flux to form a fluent slag on the surface of said melt; and
   (h) withdrawing the refined melt as product from said refining zone.

5. Method of claim 4 in which the temperature and oxygen concentration in said calcining and vaporization zones are controlled to avoid substantial oxidation of ferrous metals in said assemblies.

6. Method of claim 4 in which the partial pressure of oxygen in said vaporization zone is controlled to about $10^{-5}$ to $10^{-10}$ atmospheres.

7. A furnace for reclaiming steel from low-density scrap assemblies comprising
an upper calcining section,
a lower refining section having a hearth bottom for retaining molten metals,
an inclined intermediate vaporization section joining said upper and lower sections, and
a vestibule section communicating with said upper calcining section,
to form an elongate chamber having refractory walls, roof and floor adapted to permit semi-continuous introduction of said assemblies from said vestibule into said calcining section and thence from said calcining section by gravity through said vaporization section and into said refining section, (a) said vestibule section including
an inner door between said vestibule section and said calcining section which is normally open to permit preheating of assemblies within said vestibule by radiation from said calcining section,
an outer door which may be opened to insert said assemblies within said vestibule and which is normally closed when said inner door is open, and
means for moving said assemblies from said vestibule section into said calcining section;

(b) said calcining section including
a grate in the floor thereof to permit withdrawal of low-melting impurities separated from said assemblies in said calcining section, and
means for withdrawing off-gases from said furnace;

(c) said intermediate vaporization section being inclined at slightly greater than the angle of repose of a plurality of said assemblies and adapted to receive said assemblies from said calcining section when said assemblies are pushed out of said calcining section by the introduction of additional such assemblies from said vestibule, the lower end of said inclined vaporization section terminating above the hearth of said refining section;

(d) said refining section including
a refractory hearth forming the floor thereof adapted to retain molten metals,
means for directing an oxygen jet against the surface of molten metals contained by said hearth,
means for injecting jets of reducing hydrocarbon gases against the surface of said molten metals along the walls of said hearth to continuously sweep highly oxidized portions of said molten metals away from contact with said walls, and
means for withdrawing refined molten metals from said hearth;

(e) means for introducing and burning a partially combustible fuel-oxygen mixture into said refining section above the surface of molten metals contained by said hearth, the partial combustion products of said mixture being directed countercurrently from said refining section upwardly through said vaporization section and into said calcining section carrying vaporized and gasified impurities from said assemblies out of said furnace through said means for withdrawing off-gases; and (f) means for controllably introducing oxygen at spaced points along said vaporization and calcining sections to mix with said partial combustion products thereby increasing the degree of combustion of said fuel-oxygen mixture as said combustion products pass through said vaporization and calcining sections.

References Cited

UNITED STATES PATENTS

| 2,382,534 | 8/1945 | Baily | 75—12 |
| 2,802,732 | 9/1967 | Crolius | 75—44 |
| 3,197,539 | 7/1965 | Hinds | 13—9 |
| 3,339,905 | 9/1967 | Tezuka | 266—33 |

VOLOBYMYR Y. MAYEWSKY, Primary Examiner

H. B. GILSON, Assistant Examiner

U.S. Cl. X.R.

13—9; 75—12, 44; 266—33